US007555873B2

(12) United States Patent
Kilwin et al.

(10) Patent No.: US 7,555,873 B2
(45) Date of Patent: Jul. 7, 2009

(54) SELF-LOCATING FEATURE FOR A PI-JOINT ASSEMBLY

(75) Inventors: Jeffrey J. Kilwin, St. Peters, MO (US); Ronald J. Newcomer, St. Louis, MO (US); Philip L. Freeman, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 364 days.

(21) Appl. No.: 10/904,800

(22) Filed: Nov. 30, 2004

(65) Prior Publication Data

US 2006/0113450 A1    Jun. 1, 2006

(51) Int. Cl.
 *E04C 3/02* (2006.01)
 *B64C 1/06* (2006.01)
(52) U.S. Cl. .......................... 52/838; 244/131
(58) Field of Classification Search ............... 52/729.1, 52/729.2, 729.4, 690, 289, 702, 836, 846, 52/696, 592.1, 837, 838; 403/360, 364, 375, 403/13, 14; 244/131, 123.1, 123.7, 124; 29/897.35
See application file for complete search history.

(56) References Cited

U.S. PATENT DOCUMENTS

| 178,076 | A | | 5/1876 | Nostrand | |
|---|---|---|---|---|---|
| 1,119,248 | A | * | 12/1914 | Daly | ............... 403/375 |
| 1,652,612 | A | * | 12/1927 | Daniels | ............... 403/364 |
| RE21,921 | E | * | 10/1941 | Greulich | ............... 52/729.2 |
| 2,276,040 | A | * | 3/1942 | Hull | ............... 52/377 |

(Continued)

FOREIGN PATENT DOCUMENTS

GB    2256023    11/1992

(Continued)

OTHER PUBLICATIONS

International Search Report and Written Opinion of the International Searching Authority in PCT/US2005/042943, European Patent Office, Mar. 29, 2006.

*Primary Examiner*—Robert J Canfield
*Assistant Examiner*—Christine T Cajilig
(74) *Attorney, Agent, or Firm*—Ostrager Chong Flaherty & Broitman P.C.

(57) ABSTRACT

A self-locating feature for a pi-joint assembly is provided. The pi-joint assembly includes a substructure, a member coupled to the substructure. The substructure includes one or more land extending above one of a front side and a back side of the substructure. The land includes an outer surface, a depth location control surface and an edge location control surface. The member includes a base, a pair of axially elongated leg extending from the base to define a channel therebetween, and one or more notch located in one of the pair of axially elongated leg. The notch includes a depth contact location control surface and an edge contact location control surface, wherein the depth location control surface of the land of the substructure is correspondingly coupled to the depth contact location control surface of the notch located in one of the axially elongated leg, and the edge location control surface of the land of the substructure is correspondingly coupled to the edge contact location control surface of the notch located in one of the axially elongated leg. A method of assembling a pi-joint assembly of the present invention is also provided.

28 Claims, 3 Drawing Sheets

U.S. PATENT DOCUMENTS

| | | | | |
|---|---|---|---|---|
| 2,872,144 A | * | 2/1959 | Hobson | 248/223.41 |
| 3,263,388 A | | 8/1966 | Bogert | |
| 3,628,300 A | * | 12/1971 | Tsurumi | 52/848 |
| 3,877,193 A | * | 4/1975 | Hall | 52/665 |
| 3,892,098 A | * | 7/1975 | Kobori | 52/270 |
| 3,960,637 A | | 6/1976 | Ostrow | |
| 3,977,801 A | * | 8/1976 | Murphy | 248/188 |
| 3,989,399 A | * | 11/1976 | Slowbe | 403/245 |
| 4,019,298 A | * | 4/1977 | Johnson, IV | 52/590.1 |
| 4,416,099 A | | 11/1983 | Fiergolla et al. | |
| 4,645,168 A | * | 2/1987 | Beard | 248/548 |
| 4,823,522 A | * | 4/1989 | White | 52/167.7 |
| 4,958,954 A | * | 9/1990 | Schmanski et al. | 404/10 |
| 5,050,820 A | * | 9/1991 | Anderson | 244/131 |
| 5,134,812 A | * | 8/1992 | Hoffman et al. | 52/1 |
| 5,157,883 A | * | 10/1992 | Meyer | 52/357 |
| 5,203,132 A | * | 4/1993 | Smolik | 52/241 |
| 5,294,099 A | | 3/1994 | Dalfino | |
| 5,419,657 A | * | 5/1995 | Davis | 405/209 |
| 5,438,811 A | * | 8/1995 | Goya | 52/702 |
| 5,476,704 A | * | 12/1995 | Kohler | 428/119 |
| 5,533,307 A | * | 7/1996 | Tsai et al. | 52/167.3 |
| 5,630,298 A | * | 5/1997 | Tsai et al. | 52/167.3 |
| 5,852,908 A | * | 12/1998 | Nankin | 52/729.2 |
| 6,026,623 A | * | 2/2000 | Anderson | 52/480 |
| 6,374,570 B1 | | 4/2002 | McKague | |
| 6,718,713 B2 | | 4/2004 | McKague, Jr. et al. | |
| 6,745,536 B2 | | 6/2004 | Tallman et al. | |
| 6,748,941 B1 | * | 6/2004 | Ross | 126/500 |
| 6,754,992 B1 | * | 6/2004 | Byfield et al. | 52/36.5 |
| 6,835,261 B2 | | 12/2004 | Schmidt | |
| 6,863,767 B2 | | 3/2005 | Bersuch et al. | |
| 6,945,727 B2 | | 9/2005 | Christman | |
| 7,037,568 B1 | | 5/2006 | Rogers | |
| 2002/0053175 A1 | | 5/2002 | McKague et al. | |
| 2003/0167707 A1 | * | 9/2003 | Tsai | 52/167.5 |
| 2004/0011927 A1 | | 1/2004 | Christman et al. | |
| 2004/0051005 A1 | | 3/2004 | Bergmann | |
| 2006/0115320 A1 | | 6/2006 | Wood et al. | |

FOREIGN PATENT DOCUMENTS

WO      WO 95/18013 A      7/1995

* cited by examiner

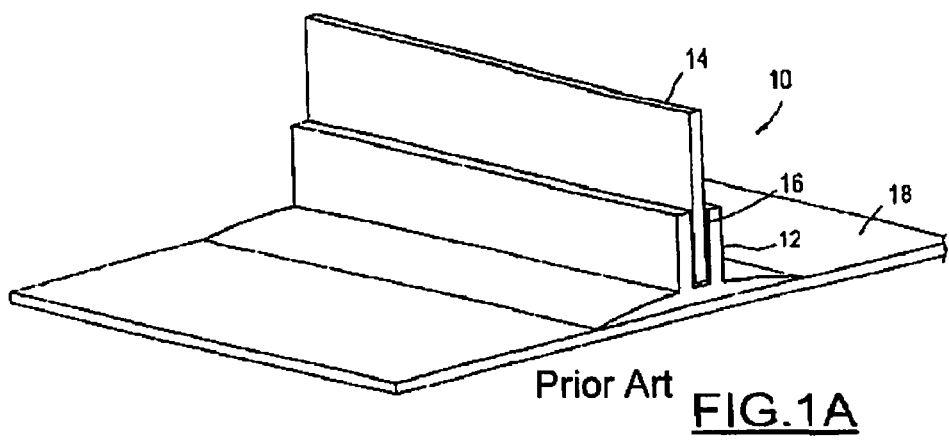
Prior Art FIG.1A
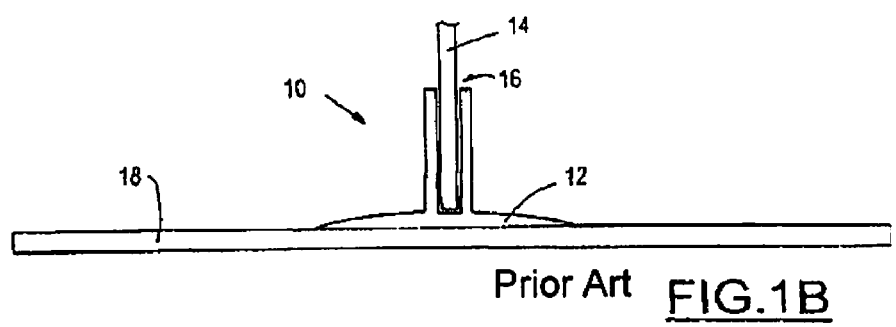
Prior Art FIG.1B
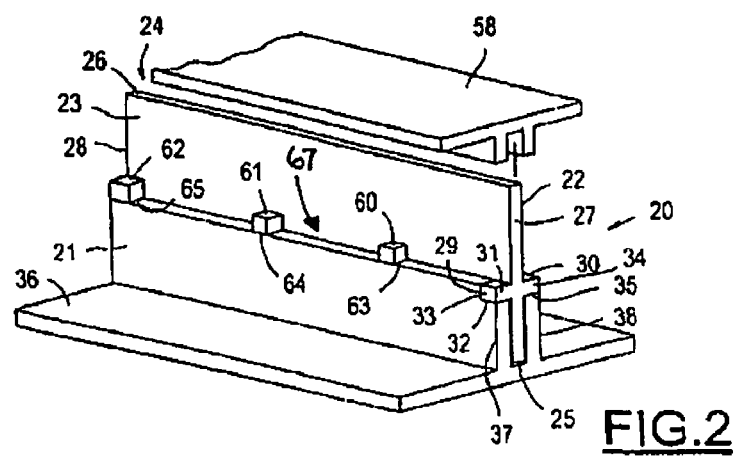
FIG.2

SELF-LOCATING FEATURE FOR A PI-JOINT ASSEMBLY

This invention was made with Government support under SCRA Subrecipient Agreement No. 2001-508, awarded by the Department of the Navy. The Government has certain rights in this invention.

RELATED APPLICATIONS

The present invention is related to application Ser. No. 10/904,801 entitled "Minimum Bond Thickness Assembly Feature Assurance" filed simultaneously herewith and incorporated by reference herein.

TECHNICAL FIELD

The present invention relates generally to a pi-joint assembly and method thereof, and more particularly, to a self-locating feature for a pi-joint assembly.

BACKGROUND DESCRIPTION

Pi-joint assemblies are beginning to be more prevalent as the choice for assembling two structural elements together, whether or not the structure is a static or dynamic structure, such as a structure used on an airplane. More importantly, the pi-joint assembly affords a way in which to connect structural components together, especially when the material of each component of the pi-joint is either a composite-to-composite or a composite-to-metallic type of connection and would otherwise require excessive material waste to fashion a typical joint connection out of one of the parts. By utilizing the pi-joint to connect structural elements, the weight of the overall structure may be reduced and the structural strength in a particular application may be increased.

One such pi-joint assembly for an aircraft is shown in FIGS. 1A and 1B. The pi-joint assembly 10 is comprised of a web 14, a pi-member 12 and a skin 18. An adhesive 16 is then typically filled in the gap formed between the web 14 and the pi-member 12 in such a way as to secure the two members. Other pi-members may be joined to the other sides of the web 14 in order to complete a given structure, thereby allowing structures like a wing of an airplane to be formed by multiple pi-joint assemblies. However, a disadvantage of such joints is the complicated assembly procedures required in order to properly align the parts prior to applying the adhesive 16 to secure the web 14 to the pi-member 12.

One known process to align the parts is by utilizing holes located in the parts, whereby the parts are located and aligned during assembly. The holes are then drilled to size after the parts are assembled, which necessitates the requirement of subsequently disassembling the parts to remove drill lubricant, chips and other foreign matter introduced between the parts during the drilling process. The cleaned parts are then reassembled and fasteners are installed along the pan to "hold" the parts in alignment with each other while the adhesive is injected between the parts and while it cures. After the adhesive is cured or becomes reasonably set, the fasteners are removed. The additional steps of locating, drilling, cleaning, reassembly, fastening and unfastening as mentioned above are termed "waste" which may be a disadvantage because time and money are lost due to the additional albeit necessary steps for the present method of assembly. Therefore, there is a need to have an improved method of assembly that reduces or eliminates the current steps. Also, there is a need to have an improved assembly that reduces or eliminates some of the assembly steps, assembly cycle time or assembly costs. Moreover, it would be advantageous to develop parts that reduces the dependency on tooling during the assembly process, reduces variation for pan-to-pan indexing and improves product repeatability and consistency Lean manufacturing concepts may identify a way to eliminate this "waste" or at least provide direction in creating a solution. Lean Technology is built on two fundamental principles: (1) elimination of waste, (2) accelerating flow in the process. The attempt is to eliminate all activities that do not add to the value of the assembly or product. Once a process is understood, the product can be assembled typically faster and in a more direct and efficient way. Simplifying the design or standardizing assembly processes may accomplish this efficiency. Some Lean Technologies have experienced up to 95% reductions in cost, cycle time, and defects. Non-value added work is also identified as waste, because it is work that is unnecessary in achieving the requirements of a final product. Eliminating non-value added work is also of benefit in saving time or money.

It may also be beneficial to use snap joint technology in a novel and inventive way to solve or improve the uncertainty of locating and aligning pi-assembly members. Snap joint assemblies provide a robust way in which to couple multiple parts together, moreover a snap joint allows for the precise placement and alignment of the parts. Therefore it may be desirable to utilize this technology in order to provide an improved method of pi-joint assembling.

SUMMARY OF THE INVENTION

A self-locating feature for a pi-joint assembly is provided. The self-locating feature for a pi-joint assembly of the present invention utilizes some of the general concepts mentioned above in creating a novel and inventive pi-joint assembly. It eliminates waste by allowing the substructure and the member to be self-locating in a more efficient manner. The self-locating features provide horizontal control, vertical control, alignment control, depth control, or edge control. The self-locating feature may also provide orientation control, whereby the assembly of the parts is "mistake proof" because the orientation self-locating features provide a single orientation in which any two parts may be located one to another. By using the "self-locating" feature of the present invention, quality may be built-in to the assembly and assembly process.

A self-locating feature for a pi-joint assembly is provided. In this embodiment, the pi-joint assembly includes a substructure, a member coupled to the substructure, and may further include a joint adhesive dispersed through the gap formed by the substructure and the member. The substructure includes one or more land extending above one of a front side and a back side of the substructure. The land includes an outer surface, a depth location control surface and an edge location control surface. The member includes a base, a pair of axially elongated leg extending from the base to define a channel therebetween, and one or more notch located in one of the pair of axially elongated leg. The notch includes a depth contact location control surface and an edge contact location control surface, wherein the depth location control surface of the land of the substructure is correspondingly coupled to the depth contact location control surface of the notch located in one of the axially elongated leg, and the edge location control surface of the land of the substructure is correspondingly coupled to the edge contact location control surface of the notch located in one of the axially elongated leg.

A method of using the invention to advantage may be accomplished by: providing a panel having a front side, a back side, and at least one boss or at least one land located on one of the front side or the back side, wherein the at least one boss or the at least one land have at least two orientation surface; providing a pi-member having a base, a pair of axially elongated leg extending from the base to define a channel therebetween, and one or more notch located in one of the pair of axially elongated leg, wherein the one or more notch have at least two counterpoising orientation surface; orienting the panel and the pi-member aligning the at least two orientation surface of the panel with the at least two counterpoising orientation surface of the pi-member; and coupling the panel and the pi-member, whereby edge control and depth control is obtained.

Other aspects and advantages of the present invention will become apparent upon the following detailed description and appended claims, and upon reference to the accompanying drawings.

BRIEF DESCRIPTION OF THE DRAWINGS

FIG. 1A is an isometric view of a pi-joint assembly attached to an aircraft skin.

FIG. 1B is a partial front view of the pi-joint assembly of FIG. 1A.

FIG. 2 is an isomeric view of a self-locating feature for a pi-joint assembly in accordance with the present invention being used to advantage.

DETAILED DESCRIPTION OF THE INVENTION

Figure 3A:
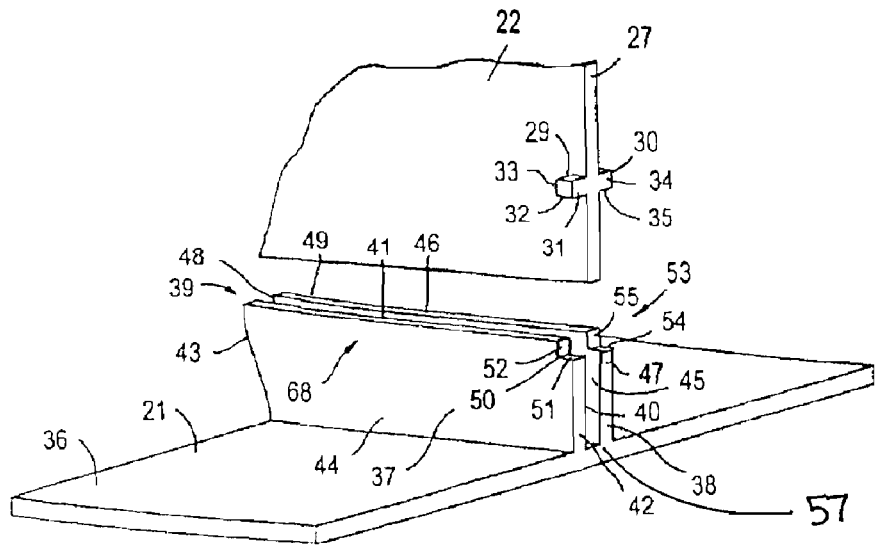
FIG. 3A is partial exploded view of the self-locating feature for a pi-joint assembly of FIG. 2.

In the following figures the same reference numerals will be used to identify the same components of a given embodiment.

Figure 3B:
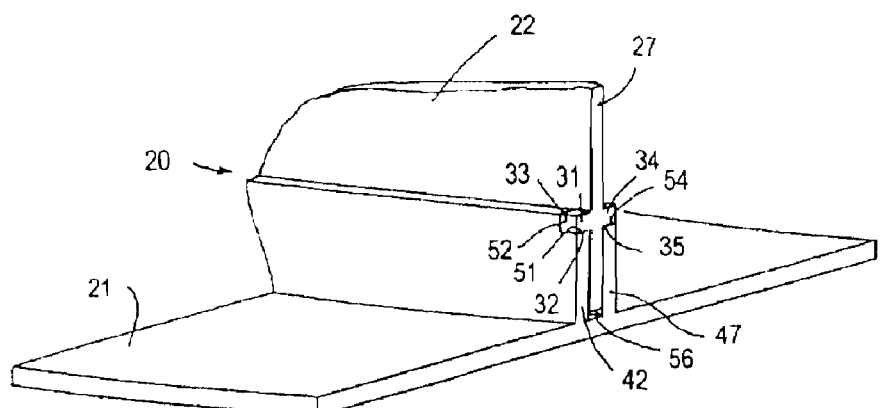
FIG. 3B is assembled view of the self-locating feature for a pi-joint assembly of FIG. 3A.

Referring now to FIG. 2, a self-locating feature for a pi-joint assembly 20 is shown in accordance with an embodiment of the disclosure. The pi-joint assembly 20 is made from the assembly of a substructure 22 and a member 21 coupled to the substructure 22. Simultaneous reference may be made to FIG. 3A and FIG. 3B, which show additional aspects of FIG. 2. FIG. 3A is partial exploded view of the self-locating feature for a pi-joint assembly of FIG. 2 and FIG. 3B is assembled view of the self-locating feature for a pi-joint assembly of FIG. 3A.

The substructure 22 may include a front side 23, a back side 24, a lower side 25, an upper side 26, a leading side 27 a trailing side 28 and two lands 29, 30. The land 29 extends above the front side 23 and the land 30 extends above the back side 24 of the substructure 22. The lands 29, 30 each form a self-locating feature of the present invention. The land 29 includes an outer surface 31, a depth location control surface 32, and an edge location control surface 33. The land 30 includes an outer surface 34, a depth location control surface 35 and an edge location control surface (not shown).

Each of the edge location control surfaces of the substructure identifies a precise location to which a corresponding part, i.e. the member of the present embodiment, may be positionally placed without guess as to either location or alignment thereby achieving directional control or placement control in at least one direction. Also, each of the depth location control surfaces of the substructure identifies a precise location to which a corresponding part may be positionally placed without guess as to either location or alignment thereby achieving directional control or placement control in at least another direction. The combination of the depth location control surface and the edge location control surface achieves directional control or placement control in at least two directions. Optionally, it is recognized that as many as one land may achieve directional control or placement control in at least two directions on a single substructure.

The substructure 22 of the present embodiment also includes three boss 60, 61, 62. The bosses 60, 61, 62 each form a self-locating feature of the present invention. Each of the boss 60, 61, 62 have a height location control surface 63, 64, 65, respectively. Each of the boss 60, 61, 62 are located on the front side 23 positioned between the leading side 28 and the trailing side 29 forming a rail path 67. The rail path 67 forms a depth defining function consistent with the present embodiment in which the rail path 67 of the substructure 22 may be correspondingly lined up with a matched rail path 68 on the member 21. The matched rail path 68 of the present embodiment is defined by an edge created by a rail side as explained below.

Each of the height location control surfaces of the substructure identifies a precise location to which a corresponding part, i.e. the member of the present embodiment, may be positionally placed without guess as to either location or alignment thereby achieving directional control or placement control in at least one direction. The combination of the height location control surfaces, the depth location control surface and the edge location control surface of the land and the boss achieves directional control or placement control in at least two directions. Optionally, it is recognized that as many as one boss may achieve directional control or placement control in at least one direction on a single substructure.

The member 21 includes a base 36, a pair of axially elongated leg 37, 38 that extend from the base 36 and define a channel 39 therebetween. The first axially elongated leg 37 includes a first channel side 40, a first rail side 41, a first leading side 42, a first trailing side 43 and a first outer side 44. The second axially elongated leg 38 includes a second channel side 45, a second rail side 46, a second leading side 47, a second trailing side 48 and a second outer side 49. Either one of the first rail side 41 or the second rail side 46 of the pair of axially elongated leg 37, 38 may form a match rail path 68. The match rail path 68 allows a structure to be matched coupled along the match rail path 68 in order to provide directional finite positioning along the assembly.

In the present embodiment, there are two notches 50, 53 located in each of the axially elongated legs 37, 38, respectively. The notch 50 includes a depth contact location control surface 51 and an edge contact location control surface 52. The edge contact location control surface 52 is adjacent the first rail side 41 located between the first channel side 40 and the first outer side 44. The depth contact location control surface 51 is adjacent the first leading side 42 located between the first channel side 40 and the first outer side 44. The notch 53 includes a depth contact location control surface 54 and an edge contact location control surface 55. The edge contact location control surface 55 is adjacent the second rail side 46 located between the second channel side 45 and the second outer side 49. The depth contact location control surface 54 is adjacent the second leading side 47 located between the second channel side 45 and the second outer side 49. Refereeing to FIG. 3A emphasizes the aforementioned details.

As depicted in the partial assembly view of FIG. 3B, the depth location control surfaces 32, 35 of the lands 29, 30 of the substructure 22 is correspondingly coupled to the depth contact location control surfaces 51, 54 of the notches 50, 53 located the axially elongated legs 37, 38, respectively, whereby the assembled relation between the substructure 22 and the member 21 is obtained in at least one direction. Also, the edge location control surface 33 of the land 29 of the substructure 22 is correspondingly coupled to the edge contact location control surface 52 of the notch 50 located in the axially elongated leg 37, whereby the assembled relation between the substructure 22 and the member 21 is obtained in at least another direction. The edge location control surface (not shown) of the land 30 of the substructure 22 is correspondingly coupled to the edge contact location control surface 55 of the notch 53 located in the axially elongated leg 38. As depicted in FIG. 2, the height location control surfaces 63, 64, 65 of the bosses 60, 61, 62 of the substructure 22 is coupled to the match rail path 68 created by the first rail side 41 of the member 21, whereby the assembled relation between the substructure 22 and the member 21 is obtained in at least one more direction.

The edge location control surface 33 of the land 29 of the substructure 22 being correspondingly coupled to the edge contact location control surface 52 of the notch 50 located in the axially elongated leg 37, allows the leading side 27 of the substructure 22 to be precisely located in the horizontal direction with the first leading side 42 of the member 21. It is recognized that the land 30 would also achieve the same result. It is also recognized that both lands 29, 30 would also achieve the same result.

The depth location control surfaces 32 of the land 29 of the substructure 22 being correspondingly coupled to the depth contact location control surfaces 51 of the notch 50 located in the axially elongated leg 37, allows the lower side 25 of the substructure 22 to be precisely located in the vertical direction with the channel floor 57 of the member 21. It is recognized that the land 30 would also achieve the same result. It is also recognized that both lands 29, 30 would also achieve the same result.

The height location control surfaces 63 of the first boss 60 of the substructure 22 being correspondingly coupled to the match rail path 68 of the first rail side 41 on the first axially elongated leg 37, allows the lower side 25 of the substructure 22 to be precisely located in the vertical direction with the channel floor 57 of the member 21. It is also recognized that all the bosses 60, 61, 62 would also achieve the same result.

The pi-joint assembly 20 further includes a filler material 56 dispersed through the gap formed by the substructure 22 and the member 21 in order to bond the two structures together when required. The filler material may also be an adhesive. One type of adhesive could be an epoxy adhesive. Optionally, the joint may not have any joint adhesive or may be fixedly attached by other fasteners as would be recognized by one of skill in the art.

In the present embodiment the assembly 20, the lower side 25 of the substructure 22 is coupled into the channel 39 of the member 21. Also, a pi member 58 may be coupled to the upper side 26 of the substructure 22. However, it is recognized that a single member being connected as herein described to the substructure shows the novel aspects of the present invention.

Alternately, the member 22 may be coupled to any of the lower side, the upper side, the leading side and the trailing side of the substructure 22. Also, additional pi-members may be coupled to any or all of the lower side, the upper side, the leading side and the trailing side of the substructure 22.

The substructure 22 of the present embodiment is precision machined from a metallic material. The member 21 of the present embodiment is precision machined from a composite material.

Alternately, the substructure or the member may be made from a composite material, metal or other suitable material for the present application. Also, the features of the present invention need not be machined, but may be made with other acceptable manufacturing method for the selected material, wherein the location and orientation of the notch, the boss or the land may be formed upon the member or the substructure as applicable.

Alternately, the depth contact location control surface of the notch being located in either leg of the member may not or may be adjacent any of the first leading side, the first trailing side, the second leading side or the second trailing side. Also, the depth contact location control surface of the notch may be adjacent any one of a first leading side, a first trailing side, a second leading side and a second trailing side, and the edge contact location control surface of the notch may be adjacent any one of a first rail side and a second rail side.

The member 21 according to the present embodiment with the base 36 and the pair of axially elongated legs 37, 38 has a pi-shaped cross-section.

Alternately, the member may have a base and a pair of axially elongated legs that angularly extend from the base or may be angled from the base forming an angled pi-shaped cross-section.

It is recognized the shape of the notch, the land or the boss in the web and pi structure may be any shape cognizable such that the assembly is self-locating, even thought the shape of the present embodiment has been depicted as a cube.

Figure 4:
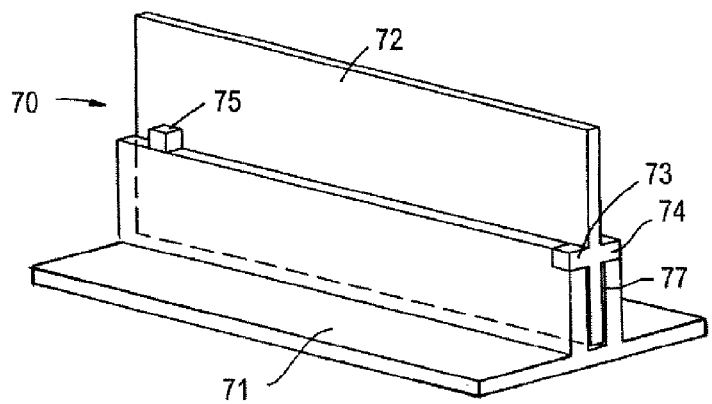
FIG. 4 is an isomeric view of a self-locating feature for a pi-joint assembly in accordance with a second embodiment the present invention being used to advantage.

FIG. 4 is an isomeric view of a self-locating feature for a pi-joint assembly 70 in accordance with a second embodiment the present invention being used to advantage. The assembly 70 includes a member 71, a substructure 72 connected to the member 71, and a filler 77. The substructure 72 has two lands 73, 74, a boss 75 located on the front side of the substructure and a boss 76 (not shown) located on the back side of the substructure. The two lands 73, 74 are positionally oriented into the two notches of the member 71, thereby locating the horizontal and vertical direction of the leading side of the substructure 72 with respect to the member 71. The two bosses 75, 76 are positionally oriented at the trailing side upon of the pair of axially elongated legs, thereby locating the vertical direction of the trailing side of the substructure 72. The two lands 73, 74 and the two bosses 75, 76 together provide a single orientation by which the substructure 72 may be positioned into the member 71. Moreover, the inventive self-locating features of the bosses and the lands as described herein enable the precise depth control and edge control required for improved joint assembly.

Alternately, a person of skill in the art would recognize that one land located at one end of the substructure and one boss located at a different end of the substructure would achieve the same direction orientation and positioning control. However, depending upon the length and size of the various sides of the substructure it may be preferable to have multiple lands and or bosses. Also, the boss may flush up with the edge of the leading side or the trailing side. Direction control or part location may also be made in either the up/down or fore/aft directions.

Figure 5:
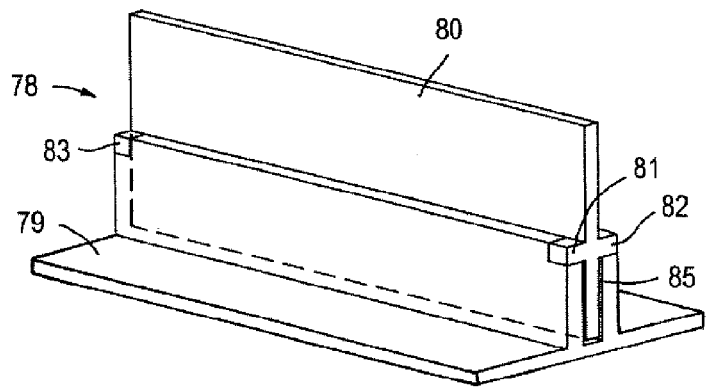
FIG. 5 is an isomeric view of a self-locating feature for a pi-joint assembly in accordance with a third embodiment the present invention being used to advantage.

FIG. 5 is an isometric view of a self-locating feature for a pi-joint assembly 78 in accordance with a third embodiment the present invention being used to advantage. The assembly 78 includes a member 79, a substructure 80 connected to the member 79, and a filler 85. The substructure 80 has four lands 81, 82, 83, and 84 (not shown). Two lands 81, 82 are located on the leading side of the substructure and two lands 83, 84 are located on the trailing side of the substructure. Of which, two lands 81, 83 are located on the front side of the substructure and two lands 82, 84 are located on the back side of the substructure. The lands 81, 82, 83, 84 are positionally oriented in opposite direction into the four notches of the member 79, thereby locating the horizontal and vertical direction of the leading side and the trailing side of the substructure 80 with respect to the member 79. Moreover, the inventive self-locating features of the lands as described herein enable the precise depth control and edge control required for improved joint assembly. However, this present embodiment is uniformly symmetrical, therefore care must be made in insuring that the proper orientation is obtained when connecting the substructure 80 to the member 79.

Alternately, one would recognize that by changing the location of just one land and corresponding notch, or by changing the shape of just one land would provide a means by which a single or "mistake proof" orientation could also be achieved between the parts.

Alternately, the lands 81, 83 that are oppositely opposed may provide for a snap fit arrangement, where the parts exhibit a snap fit engagement in addition to being precisely located one to another. The benefit of a "snap together" assembly would improve the concept of assembling composite-to-composite or composite-to-metallic structure while insuring alignment or orientation. Snap-fit engagement of the parts may be influenced by factors such as snap engagement, rake angle, surface coefficient of friction, material modulus, and cantilever taper ratio.

The substructure of the various embodiments need not have, but may have a front side and a back side each having areas significantly larger than the lower side, the upper side, the leading side or the trailing side. More specifically, the substructure may resemble a panel having narrow sidewalls. The substructure need not be continuous, but may have various forms including a lattice or an array that is capable of forming a panel structure. Moreover, the substructure may have various numbers of sides capable of performing the present invention, even though all embodiments have been represented as a 6-sided structure.

Figure 6:
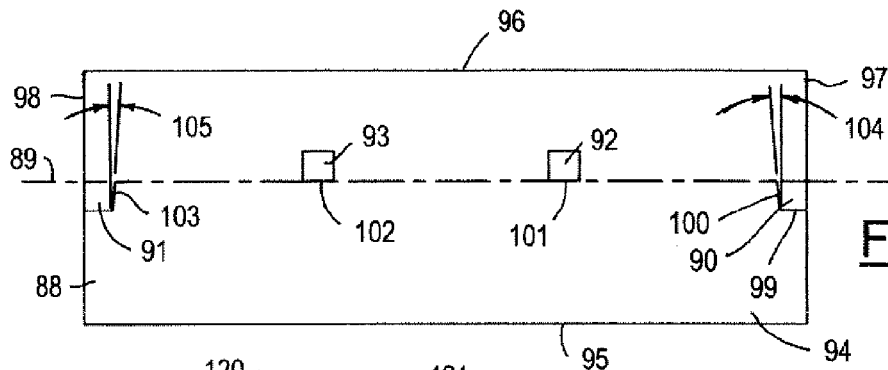
FIG. 6 is a front view of an alternate embodiment of a substructure for a pi-joint assembly in which the invention may be used to advantage.

FIG. 6 is a front view of an alternate embodiment of a substructure 88 for a pi-joint assembly in which the invention may be used to advantage. In this embodiment, a precision placement example is exhibited showing two bosses 92, 93 and two lands 90, 91 extending above a front side 94 of the substructure 88. It should be noted that a member (not shown) would also correspond to and be capable of receiving the substructure 88 by using the present embodiment of the invention to advantage.

In this embodiment the bosses 92, 93 and the lands 90, 91, are located in-between the lower side 95 and the upper side 96 on the front side 94. The outer surface of the lands 90, 91 each are flush with the leading side 97 and the trailing side 98 of substructure 88, respectfully. The depth location control surface 99 of the land 90 and the height location control surface 101 of the boss 92 both face in the general direction of the lower side 95. The edge location control surface 100 of the land 90 is oriented in the general direction of the trailing side 98 and the edge location control surface 103 of the land 91 is oriented in the general direction of the leading side 97. Both edge location control surfaces 100, 103 have offset or tilted angles 104, 105 as indicated in the direction of the lower side 95. The edge location control surfaces 100, 103 allow the substructure 88 to be positionally fitted to a member without interference.

The height location control surface of the bosses 92, 93 together with the lands 90, 91 form a rail path 89 extending between the leading side 97 and the trailing side 98. The rail path 89 of the substructure 88 allows a member to be match coupled to the rail path 89.

Figure 7:
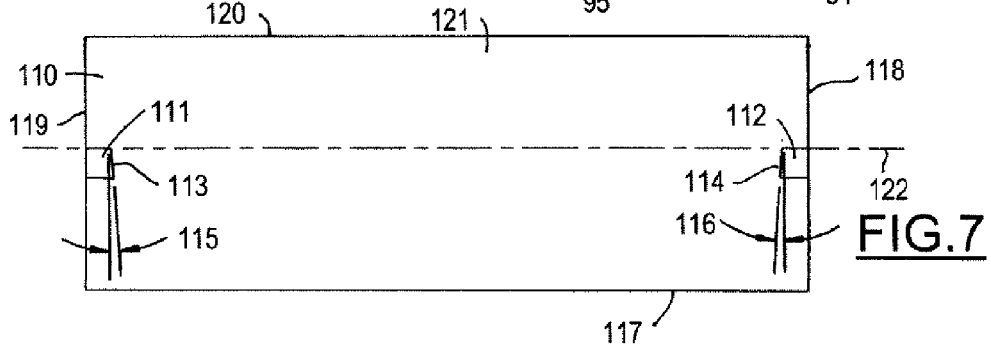
FIG. 7 is a front view of a second alternate embodiment of a substructure for a pi-joint assembly in which the invention may be used to advantage.

FIG. 7 is a front view of a second alternate embodiment of a substructure 110 for a pi-joint assembly in which the invention may be used to advantage. In this embodiment, a precision placement example is exhibited showing two lands 111, 112 extending above a back side 121 of the substructure 110. It should be noted that a member (not shown) would also correspond to and be capable of receiving the substructure 110 by using the present embodiment of the invention to advantage.

In this embodiment, the lands 111, 112 are located in-between the lower side 117 and the upper side 120 on the back side 121 of the substructure 110. The outer surface of the lands 111, 112 each are flush with the leading side 119 and the trailing side 118 of substructure 110, respectively. Alternately, the lands 111, 112 need not be flush with sides of the substructure. The edge location control surface 114 of the land 112 is oriented in the general direction of the leading side 119 and the edge location control surface 113 of the land 11 is oriented in the general direction of the trailing side 118. Both edge location control surfaces 100, 103 have reverse offset or reverse tilted angle 115, 116 as indicated in the direction of the upper side 120. The edge location control surfaces 113, 114 allow the substructure 88 to be positionally coupled to a member with interference. Moreover, the substructure 110 may be snap-fit to the member.

The height location control surface of the lands 111, 112 forms a rail path 122 extending between the leading side 119 and the trailing side 118. The rail path 122 of the substructure 110 allows a member to be matched coupled to the rail path 122.

Alternately, for a substructure having one or more lands which have edge contact location control surfaces with offset, tilted, reverse offset, or reverse tilted angle; the substructure may be coupled to the member where coupling is by resting, placing, positioning, setting, locking, or snap-fitting the structure to the member.

A method of using the invention to advantage may be accomplished by: providing a substructure having a front side, a back side, and at least one boss or at least one land located on one of the front side or the back side, wherein the at least one boss or the at least one land have a depth location control surface and an edge location control surface; providing a member having a base, a pair of axially elongated leg extending from the base to define a channel therebetween, and one or more notch located in one of the pair of axially elongated leg, wherein the one or more notch have a depth contact location control surface and an edge contact location control surface; orienting the substructure and the member, wherein an edge orientation and a depth orientation is defined by the substructure and the member; and coupling the substructure to the member obtaining the edge orientation and the depth orientation. A method of using the invention to advantage may further include disposing a filler material between the substructure and the member.

When coupling the substructure to the member, the depth location control surface and the edge location control surface of the substructure is coupled to the depth contact location control surface and the edge contact location control surface of the one of the pair of axially elongated leg.

Alternately, the substructure may be coupled to the member by snap-fitting the substructure to the member.

A method of using the invention to advantage may be accomplished by: providing a panel having a front side, a back side, and at least one boss or at least one land located on one of the front side or the back side, wherein the at least one boss or the at least one land have at least two orientation surface; providing a pi-member having a base, a pair of axially elongated leg extending from the base to define a channel therebetween, and one or more notch located in one of the pair of axially elongated leg, wherein the one or more notch have at least two counterpoising orientation surface; orienting the panel and the pi-member aligning the at least two orientation surface of the panel with the at least two counterpoising orientation surface of the pi-member; and coupling the panel and the pi-member, whereby edge control and depth control is obtained.

Alternately, when coupling the substructure to the member achieving the pi-joint assembly, the panel may have at least two land and the pi-joint has at least two notch, wherein coupling the panel and the pi-member is by snap fitting at least two land into the at least two notch.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. An assembly comprising:
   a substructure comprising:
      a front side;
      a back side;
      a lower side;
      an upper side;
      a leading side;
      a trailing side, wherein the front side and the back side of the substructure each have areas larger than the lower side, the upper side, the leading side or the trailing side of the substructure, wherein the lower side, the upper side, the leading side and the trailing side of the substructure each form the edges of a panel, wherein the front side forms the front of the panel and further, wherein the back side forms the back of the panel; and
      one or more land extending above one of the front side and the back side, wherein the land is located in-between the lower side and the upper side of the substructure, the land comprising an outer surface, a depth location control surface, and an edge location control surface, wherein the outer surface is adjacent one of the edge of the leading side and the trailing side, wherein the depth location control surface is oriented in the direction of and parallel to the lower side of the substructure and further, wherein the edge location control surface is oriented in the general direction of the other of the leading side and the trailing side; and
   a member coupled to the substructure, the member comprising:
      a base having a generally planar surface;
      a pair of axially elongated legs extending from the planar surface of the base to define a channel therebetween, wherein the first axially elongated leg comprises a first channel side, a first rail side, a first leading side, a first trailing side and a first outer side, and the second axially elongated leg comprises a second channel side, a second rail side, a second leading side, a second trailing side and a second outer side; and
      one or more notch located in one of the pair of axially elongated legs, the one or more notch comprising a depth contact location control surface and an edge contact location control surface, wherein the edge contact location control surface is immediately adjacent one of the first rail side and the second rail side of the one of the pair of legs, wherein the depth contact location control surface is immediately adjacent one of the first leading side, the first trailing side, the second leading side and the second trailing side of the one of the pair legs and further, wherein the depth contact location control surface is oriented in the direction of and parallel to the one of the first rail side and second rail side;
   wherein one of the first rail side and the second rail side of the pair of axially elongated legs form a match rail path, whereby the substructure is matched coupled along the match rail path of the member.

2. The assembly according to claim 1, wherein the outer surface of the land flushes with the one of the edge of the leading side and the trailing side of the substructure.

3. The assembly according to claim 1, wherein the substructure is machined from a metallic material or a composite material.

4. The assembly according to claim 1, further comprising one or more boss extending above one of the front side and the back side of the substructure, wherein the boss is located in-between the lower side and the upper side of the substructure, the boss comprising a height location control surface.

5. The assembly according to claim 4, wherein the height location control surface of the boss is oriented in the direction of the lower side.

6. The assembly according to claim 4, wherein the height location control surface of the one or more boss together with the one or more land forming a rail path extending between the leading side and the trailing side, whereby the member is matched coupled along the rail path of the substructure.

7. The assembly according to claim 4, wherein the boss flushes with one of the edge of the leading side and the trailing side of the substructure.

8. The assembly according to claim 1, wherein the edge location control surface of the one or more land has an approach angle being oriented in the direction of the other of the leading side and the trailing side of the substructure toward the lower side, whereby the member is coupled to the substructure and rest against the edge location control surface.

9. The assembly according to claim 1, wherein the edge location control surface of the one or more land has a reverse tilted angle being oriented in the direction of the other of the leading side and the trailing side of the substructure, toward the upper side, whereby the member is coupled to the substructure.

10. The assembly according to claim 1, wherein the edge location control surface of the one or more land has a reverse tilted angle being oriented in the direction of the other of the leading side and the trailing side of the substructure, toward the upper side, whereby the member is snap-fit to the substructure.

11. The assembly according to claim 1, wherein the member is machined from a metallic material or a composite material.

12. The assembly according to claim 1, wherein the member has a pi-shaped cross-section.

13. The assembly according to claim 1, wherein the member has an angled pi-shaped cross-section.

14. The assembly according to claim 1 wherein the pair of axially elongated legs angularly extends from the planar surface of the base.

15. The member according to claim 1, wherein the edge contact location control surface of the one or more notch has a contact orientation angle, whereby the substructure is coupled to the member where coupling is by resting, placing, positioning, setting, locking, or snap-fitting the substructure to the member.

16. The assembly of claim 1, wherein the land is cube-shaped.

17. An assembly comprising:
a substructure comprising:
a front side;
a back side;
a lower side;
an upper side;
a leading side;
a trailing side, wherein the front side and the back side of the substructure each have areas larger than the lower side, the upper side, the leading side or the trailing side of the substructure; and
one or more land extending above one of the front side and the back side, the land comprising an outer surface, a depth location control surface, and an edge location control surface, wherein the outer surface is adjacent one of the edge of the leading side and the trailing side, wherein the depth location control surface is oriented in the direction of and parallel to the lower side of the substructure and further, wherein the edge location control surface is oriented in the general direction of the other of the leading side and the trailing side; and
a member coupled to the substructure, wherein the lower side of the substructure is coupled into the channel of the member, the member comprising:
a base having a generally planar surface;
a pair of axially elongated legs extending perpendicularly from the planar surface of the base to define a channel therebetween, wherein the first axially elongated leg comprises a first channel side, a first rail side, a first leading side, a first trailing side and a first outer side, and the second axially elongated leg comprises a second channel side, a second rail side, a second leading side, a second trailing side and a second outer side; and
one or more notch located in one of the pair of axially elongated legs, the notch comprising a depth contact location control surface and an edge contact location control surface, wherein the edge contact location control surface is immediately adjacent one of the first rail side and the second rail side of the one of the pair of legs, wherein the depth contact location control surface is immediately adjacent one of the first leading side, the first trailing side, the second leading side and the second trailing side of the one of the pair legs and further, wherein the depth contact location control surface is oriented in the direction of and parallel to the one of the first rail side and the second rail side; wherein the depth location control surface of the one or more land of the substructure is correspondingly coupled to the depth contact location control surface of the one or more notch located in one of the pair of axially elongated leg, and the edge location control surface of the one or more land of the substructure is correspondingly coupled to the edge contact location control surface of the one or more notch located in one of the pair of axially elongated leg.

18. The assembly of claim 17, further comprising a filler material inter disposed between the substructure and the member.

19. The assembly of claim 18, wherein the filler material is an adhesive.

20. The assembly of claim 18, wherein the filler material is an epoxy adhesive.

21. The assembly of claim 17, wherein the member is coupled to the lower side and further comprising a pi-joint coupled to the upper side.

22. The assembly of claim 17, further comprising one or more boss extending above one of the front side and the back side of the substructure, the boss comprising a height location control surface, wherein the height location control surface of the one or more boss together with the one or more land forming a rail path extending between the leading side and the trailing side, wherein one of the first rail side and the second rail side of the pair of axially elongated leg form a match rail path, wherein the rail path of the substructure is matched coupled along the match rail path of the member.

23. A method of assembling a joint comprising:
providing a substructure having a front side, a back side, a leading side, a trailing side, and at least one land located on one of the front side or the back side and in-between the lower side and the upper side of the substructure, wherein the at least one land has an outer surface, a depth location control surface and an edge location control surface, wherein the outer surface is adjacent one of the edge of the leading side and the trailing side and further, wherein the depth location control surface is oriented in the direction of and parallel to the lower side of the substructure, wherein the edge location control surface is oriented in the general direction of the other of the leading side and the trailing side and further, wherein the front side and the back side of the substructure each have areas larger than the lower side, the upper side, the leading side or the trailing side of the substructure;
providing a member having a base having a generally planar surface, a pair of axially elongated legs extending perpendicularly from the planar surface of the base to define a channel therebetween, and one or more notch located in one of the pair of axially elongated legs, wherein each leg comprises a channel side, a rail side, a leading side, a trailing side and an outer side, wherein the one or more notch has a depth contact location control surface and an edge contact location control surface, wherein the edge contact location control surface is immediately adjacent the rail side of the one of the pair of legs, wherein the depth contact location control surface is immediately adjacent one of the leading side and the trailing side of the one of the pair legs; and further, wherein the depth contact location control surface is oriented in the direction of and parallel to the one of the first rail side and the second rail side;
orienting the substructure and the member, wherein an edge orientation and a depth orientation is defined by the substructure and the member; and coupling the substructure to the member obtaining the edge orientation and the depth orientation;

wherein the depth location control surface and the edge location control surface of the substructure is coupled to the depth contact location control surface and the edge contact location control surface of the one of the prior of axially elongated leg.

24. The method of assembling a joint according to claim 23, wherein coupling the substructure to the member is by snap fitting the substructure to the member.

25. The method of assembling a joint according to claim 23, further comprising disposing a filler material between the substructure and the member.

26. A method of assembling a pi-joint comprising:

providing a panel having a front side, a back side, a leading side, a trailing side, an upper side, and a lower side and at least one land located on one of the front side or the back side, wherein the front side forms the front of the panel and further, wherein the back side forms the back of the panel, wherein the at least one land has at least two orientation surface wherein a first orientation surface is adjacent one of the edge of the leading side and the trailing side and further, wherein a second orientation surface is oriented in the general direction of and parallel to the lower side of the panel;

providing a pi-member having a base having a generally planar surface, a pair of axially elongated leg extending from the planar surface of the base to define a channel therebetween wherein each elongated leg comprises a channel side, a rail side, a leading side, a trailing side and an outer side, and at least one notch located in one of the pair of axially elongated leg, wherein the at least one notch has at least two counterpoising orientation surface, wherein a first counterpoising orientation surface is immediately adjacent the rail side of the one of the pair of legs and further, wherein a second counterpoising orientation surface is immediately adjacent one of the leading side and the trailing side of the one of the pair of legs;

coupling the lower side of the substructure into the channel of the member orienting the panel and the pi-member aligning the at least two orientation surface of the panel with the at least two counterpoising orientation surface of the pi-member; and coupling the panel and the pi-member, whereby edge control and depth control is obtained.

27. The method of assembling a pi-joint according to claim 26, wherein the panel has a second land and the pi-joint has a second notch, wherein coupling the panel and the pi-member is by snap fitting the at least one land into the at least one notch and snap fitting the second land into the second notch.

28. The method of assembling a pi-joint according to claim 27, wherein the at least one land is on the front side of the panel and the second land is on back side of the panel, and the at least one notch is in one of the pair of axially elongated leg of the pi-member, corresponding to the front side of the panel, and the second notch is in one of the pair of axially elongated leg of the pi-member, corresponding to the back side of the panel.

* * * * *